(12) United States Patent
Stewart et al.

(10) Patent No.: US 7,493,822 B2
(45) Date of Patent: Feb. 24, 2009

(54) SMALL GAUGE PRESSURE SENSOR USING WAFER BONDING AND ELECTROCHEMICAL ETCH STOPPING

(75) Inventors: Carl E. Stewart, Plano, TX (US); Gilberto Morales, Arlington, TX (US); Richard A. Davis, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/825,237

(22) Filed: Jul. 5, 2007

(65) Prior Publication Data

US 2009/0007681 A1 Jan. 8, 2009

(51) Int. Cl.
*G01L 9/06* (2006.01)
(52) U.S. Cl. .............................. 73/721; 438/53; 257/419
(58) Field of Classification Search .................... 73/721, 73/724, 727; 438/53; 257/419
See application file for complete search history.

(56) References Cited

U.S. PATENT DOCUMENTS

| | | | | |
|---|---|---|---|---|
| 5,295,395 A | * | 3/1994 | Hocker et al. | 73/721 |
| 5,576,251 A | * | 11/1996 | Garabedian et al. | 438/53 |
| 5,614,678 A | * | 3/1997 | Kurtz et al. | 73/727 |
| 6,038,928 A | * | 3/2000 | Maluf et al. | 73/724 |
| 6,629,465 B1 | | 10/2003 | Maluf et al. | 73/724 |
| 2004/0045934 A1 | * | 3/2004 | Harvey et al. | 216/60 |

* cited by examiner

*Primary Examiner*—Andre J Allen
(74) *Attorney, Agent, or Firm*—Kermit D. Lopez; Luis M. Ortiz

(57) ABSTRACT

A gauge pressure sensor apparatus and a method of forming the same. A constraint wafer can be partially etched to set the diaphragm size, followed by bonding to a top wafer. The thickness of the top wafer is either the desired diaphragm thickness or is thinned to the desired thickness after bonding. The bonding of top wafer and constraint wafer enables electrochemical etch stopping. This allows the media conduit to be etched through the back of the constraint wafer and an electrical signal produced when the etching reaches the diaphragm. The process prevents the diaphragm from being over-etched. The invention allows the die size to be smaller than die where the diaphragm size is set by etching from the back side.

17 Claims, 6 Drawing Sheets

SMALL GAUGE PRESSURE SENSOR USING WAFER BONDING AND ELECTROCHEMICAL ETCH STOPPING

TECHNICAL FIELD

Embodiments are generally related to gauge pressure sensors. Embodiments are also related to techniques for configuring gauge pressure sensors utilizing bonding and electrochemical etch stopping.

BACKGROUND OF THE INVENTION

Micromachined pressure sensors are widely incorporated into diverse equipment such as medical, laboratory, and industrial equipment and automotive circuitry. Smaller, more accurate pressure sensors are required for a new generation of equipment in the medical, analytical, and industrial fields while the cost of such pressure sensors must remain low in order to achieve advances at competitive prices.

Typical micromachined pressure sensors can be configured by forming a cavity on the back side of a silicon wafer. Silicon gauge pressure sensors created using semiconductor processes can be made smaller in size by bonding two wafers together. New and novel approaches utilize two wafers bonded together to create a diaphragm. In this approach the first wafer has a cavity formed on one side to set the diaphragm size. A second wafer is then bonded to the first over the cavities. The second wafer can either be the required diaphragm thickness or be thinned to the required thickness. In micro-machined pressure sensors that measure gauge or differential pressure, the cavity in the first wafer must remain open during processing or opened at some point during processing to provide the channel to the back-side of the diaphragm, which is necessary to allow for gauge or differential pressure to be measured. Dirt or debris from processing steps can enter the cavity and remain within the cavity, interfering with the diaphragm as it deflects, which causes the pressure sensor to supply inaccurate read-out of the pressure as measured by the pressure sensor.

The interference due to lodging of minute particulates while configuring gauge pressure sensors can be avoided by forming the back side pressure inlet after completion of all front-side processing. The challenge in this final etch step is to ensure the integrity of the thin diaphragm and the cavity walls supporting the thin diaphragm. In other words, once the backside pressure inlet is fully etched, the etching should immediately stop on the thin diaphragm that is now exposed to the etching chemistry.

In one prior art arrangement, for example, a silicon gauge pressure sensor can be configured by forming a cavity in a first wafer and fusion bonding a second wafer over the first wafer in an oxidizing environment. When etching the back side pressure inlet the thin oxide can be used as an etch stop when the etching reaches the diaphragm. The oxide will etch at a slower rate but if the wafer is not removed from the etch quickly the oxide will break down and the diaphragm will be over-etched.

Based on the foregoing, it is believed that a need exists for an electrochemical etch stopping method that overcomes such problems. It is believed that the system and method disclosed herein offers a solution to these problems by utilizing an electrochemical etch stopping method when performing the final etch to provide an electrical signal of when the etching has reached the diaphragm.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved silicon gauge pressure sensor.

It is another aspect of the present invention to provide a method for configuring a gauge pressure sensor employing wafer bonding and electrochemical etch stopping.

The aforementioned aspects and other objectives and advantages can now be achieved as described herein. A gauge pressure sensor apparatus and method of forming the same are described herein. In general, such a pressure sensor can be configured by etching a constraint wafer partially to set the diaphragm size followed by bonding to a top wafer. The thickness of the top wafer is either the desired diaphragm thickness or is thinned to the desired thickness after bonding. Elements such as piezoresistive or capacitive elements can then be fabricated on the top diaphragm wafer before the final etching is accomplished in order to open a conduit for the pressure media. The wafer bonding of the top wafer and the constraint wafer enables electrochemical etch stopping to be utilized for determining when the final etching is completed. Such a configuration and process prevents the diaphragm from being etched. Additionally, this allows the die size to be smaller than die where the diaphragm size can be set by etching from the back side.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
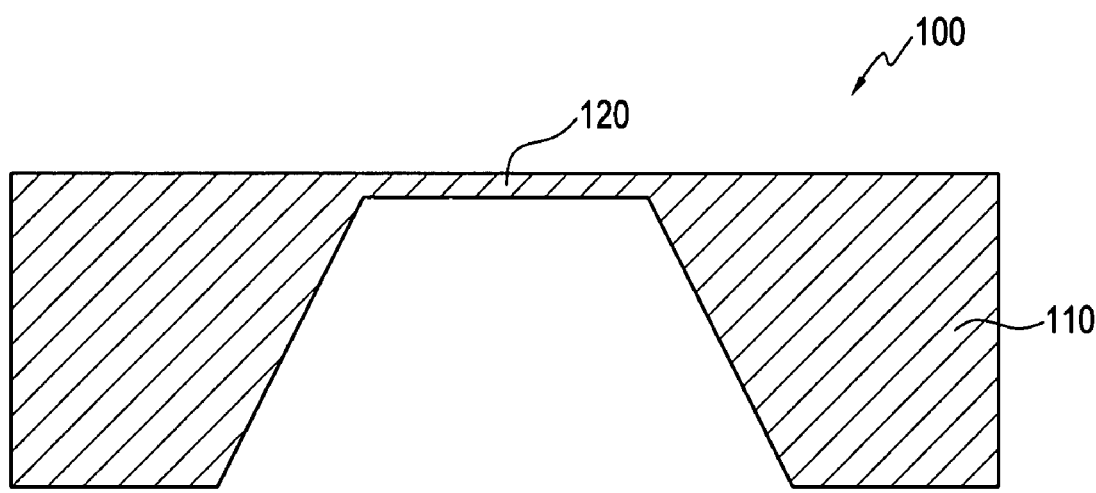
FIG. 1 illustrates a prior art method of manufacturing a micro-machined gauge pressure sensor.

FIG. 1, illustrates a prior art micro-machined gauge pressure sensor 100. In the prior art apparatus 100 depicted in FIG. 1, an anisotropic back etch processes can be utilized to etch a single wafer 100 and expose a thin silicon diaphragm 120 supported over a silicon frame 110. The wafer 100 is subsequently etched from the backside to form the thin diaphragm 120 upon which piezoresistors can be formed utilizing implantation and diffusion techniques. Here, however, the die size is substantially greater than the minimum desired geometrical dimensions.

Figure 2:
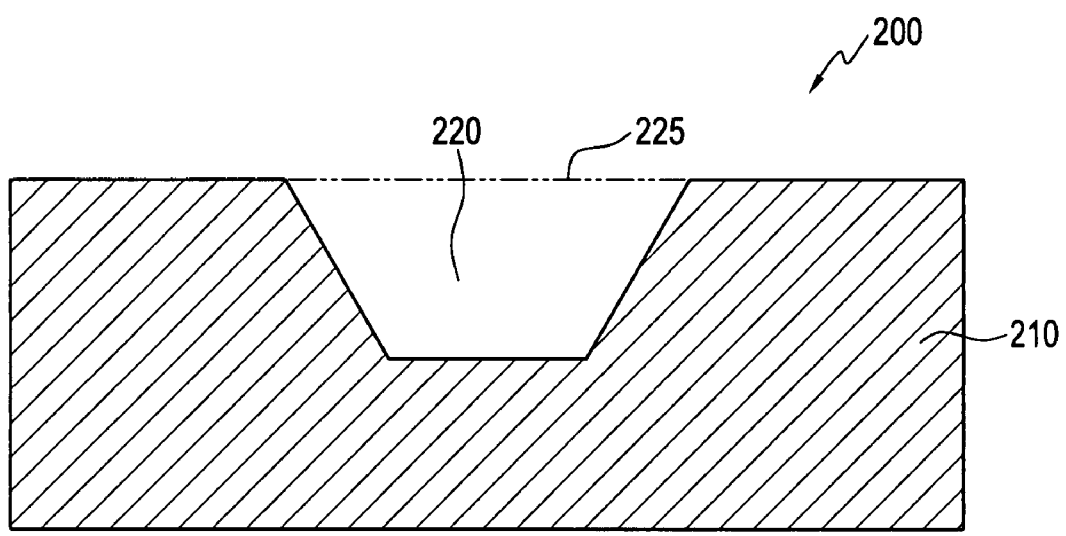
FIGS. 2 to 5 illustrates a simplified process flow for configuring a silicon gauge pressure sensor which can be implemented in accordance with a preferred embodiment.

FIGS. 2-5 illustrates a simplified process flow for configuring a silicon gauge pressure sensor 200 in accordance with a preferred embodiment; Silicon gauge pressure sensor 200 can be fabricated by utilizing a P-type substrate wafer 210. The P-type substrate wafer 210 can be patterned by etching. The etch forms a cavity 220 having walls that generally converge from the surface of the P-type substrate wafer 210 to the bottom of the cavity 220. The depth of the cavity 220 can be controlled by adjusting the etch time. The length and width or diameter of the cavity 220 at the surface 225 that can support the N type diaphragm wafer 330 as shown in FIG. 2 can be selected based on the desired length and width or diameter of the N type diaphragm wafer 330.

Figure 3:
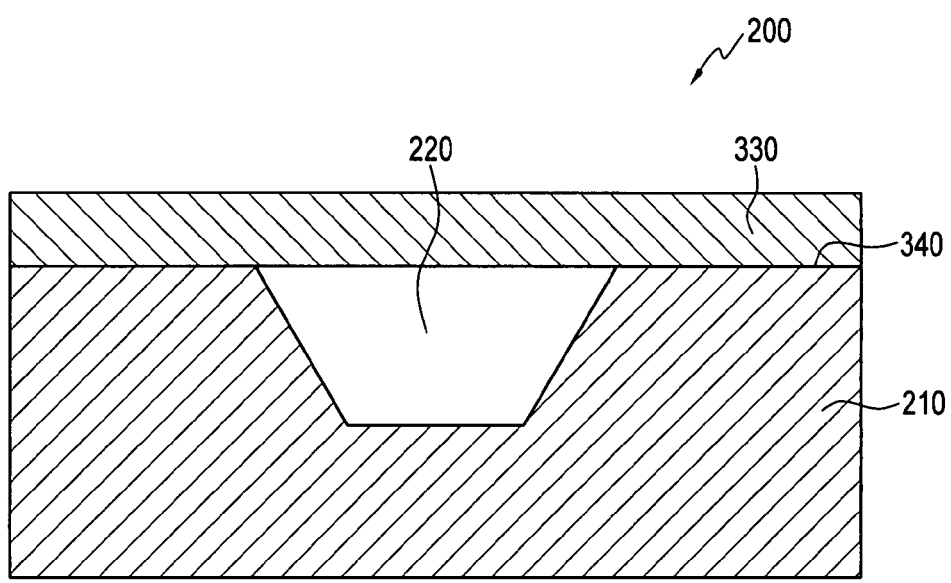

FIG. 3 illustrates a side view of a P-type substrate wafer 210 after fusion bonding with an N-type diaphragm wafer 330 for configuring the silicon gauge pressure sensor 200 in accordance with a preferred embodiment. Note that in FIGS. 2-5 identical or similar parts or elements are indicated by identical reference numerals. P-type substrate wafer 210 can be bonded to N-type diaphragm wafer 330 by silicon fusion bonding. A PN junction 340 can be formed by fusion bonding the N-type top wafer 330 to the P-type substrate wafer 210. The fusion bonding of N-type wafer and P-type constraint wafer creates a PN junction for electrochemical etch stopping when performing the final etch.

Figure 4:
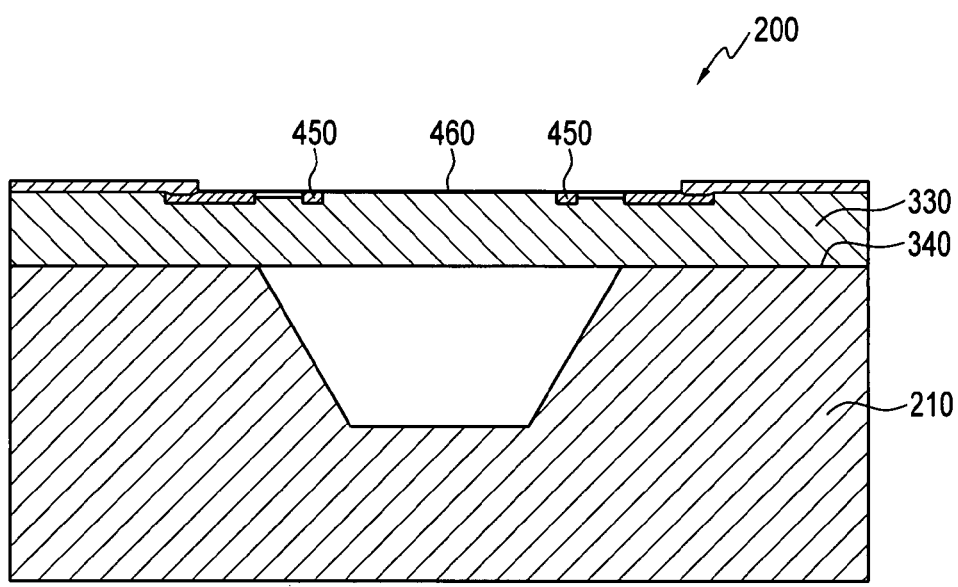

FIG. 4 illustrates a side view of an N-type diaphragm wafer with piezoresistive elements fabricated after fusion bonding with a P-type substrate wafer 210 for configuring the silicon gauge pressure sensor 200 in accordance with a preferred embodiment. An insulating layer 460 can be provided to protect against deterioration of the N-type diaphragm wafer 330 and electrical features there in. One or more piezoresistors 450 and other elements employed in semiconductor devices can then be fabricated. (The top side process including interpretive and other related elements and circuits are not the subject of this invention and are therefore not described in detail). The final step for configuring a silicon gauge pressure sensor is electrochemical etching the back side of the constraint wafer.

Figure 5:
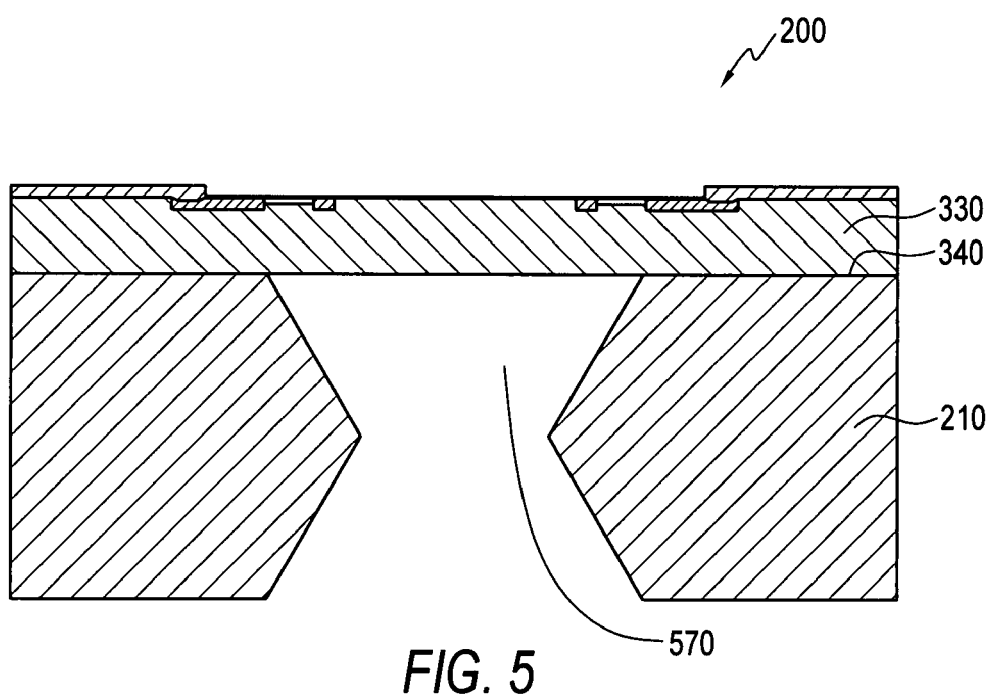

FIG. 5 illustrates a side view of the configured silicon gauge pressure sensor 200 accordance with a preferred embodiment. The view includes P-type substrate wafer 210 bounded to the top processed N-type diaphragm substrate wafer 330. The PN junction 340 allows the media conduit 570 to be etched through the back of the P-type constraint wafer 210 and provides an electrical signal to indicate that the etching has reached the diaphragm wafer 330. The configuration prevents the N-type diaphragm wafer 330 from being etched. Other methods for preventing the N-type diaphragm wafer 330 from being etched require additional processes and add cost. The embodiments disclosed herein allow the die sizes to be set by the diaphragm side length etched in the P-type constraint wafer 210, thereby allowing a smaller die size than would be possible if the diaphragm were etched from the back side. Another advantage of the present invention over the prior art methods is that for the same die attach area; the die size is comparatively smaller.

Figure 6:
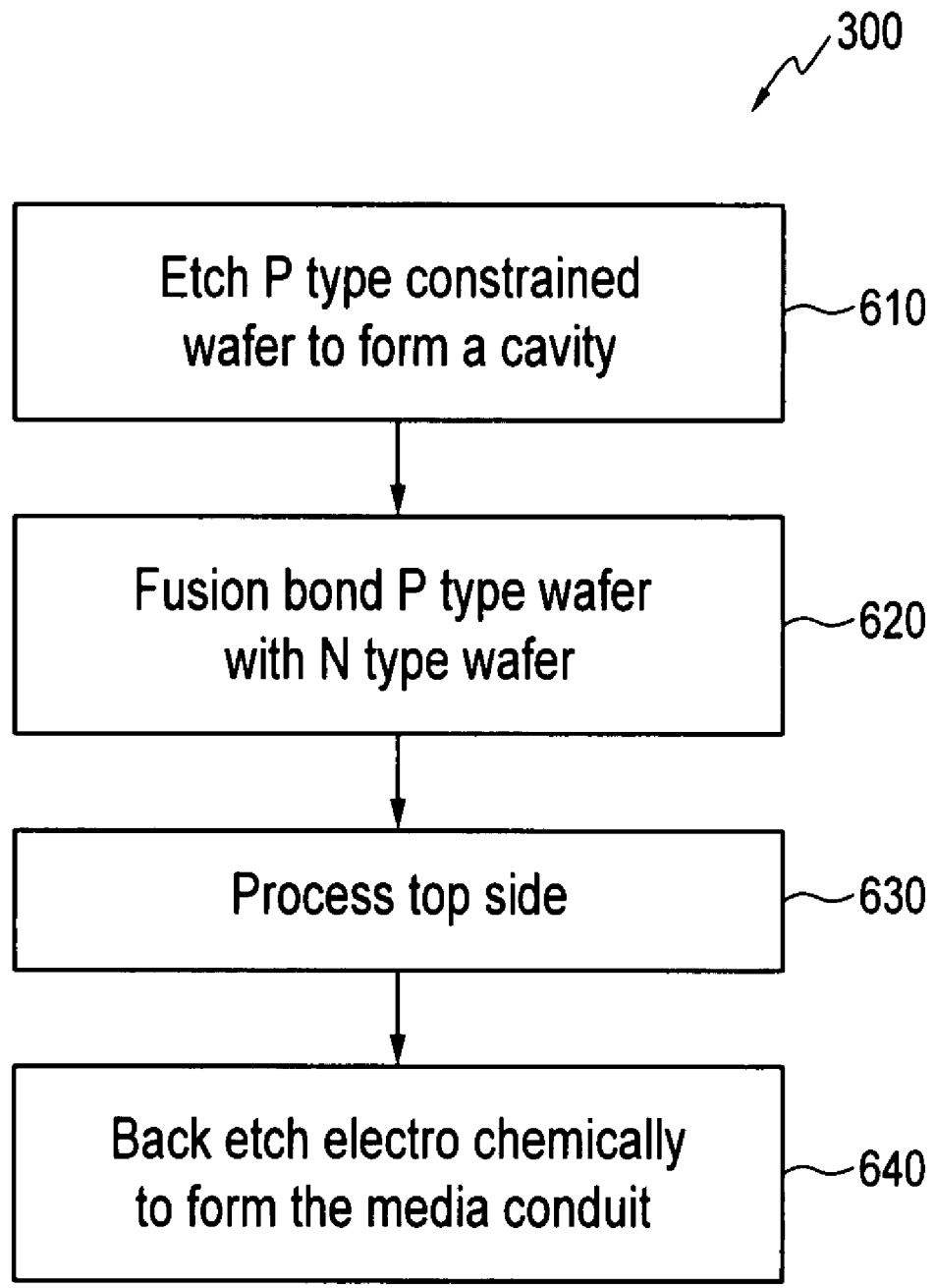
FIG. 6 illustrates a high level flowchart of operations depicting logical operational steps for configuring a silicon gauge pressure sensor, which can be implemented in accordance with a preferred embodiment.

FIG. 6 illustrates a high level flowchart of operations depicting logical operational steps of a method 300 for configuring the silicon gauge pressure sensor 200 in accordance with a preferred embodiment. As indicated at block 610, the P-type constraint silicon wafer 210 can be etched to form a cavity 220. Next, as depicted at block 620, an N-type silicon wafer 330 can be fusion bonded to the P-type constraint wafer 210, thereby forming a PN junction 340 for electrochemical etch stopping when performing the final etch. Next, as described at block 630, the top side fabrication can be carried out. This step includes the normal fabrication steps for configuring a semiconductor device wherein the piezoresistors and other elements and layers are processed. Next, as indicated at block 640, a media conduit can be etched through the back of the P-type constraint wafer 210 and the etching can be stopped electrochemically. This prevents the N-type diaphragm wafer 330 from being etched.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of configuring a pressure sensor apparatus, comprising:

etching a constraint wafer to form a cavity, wherein said cavity possesses walls and an opening to at least one surface of said constraint wafer;

forming a composite structure by bonding a top wafer to said constraint wafer, such that a portion of said top wafer covers said opening of said cavity of said constraint wafer;

bonding said constraint wafer to said top wafer to create a junction that enables electrochemical etching and provides an electrical signal when an etching thereof should be stopped; and back etching said composite structure to form a media conduit in said composite structure, wherein said media conduit opens to a surface of said composite structure in order to provide for said pressure sensor apparatus.

2. The method of claim 1 further comprising top processing said top wafer with a plurality of piezoresistors and related circuitry and elements.

3. The method of claim 1 wherein said bonded junction between the constraint wafer and the top wafer enables electrochemical etch stopping when performing a final etch.

4. The method of claim 1 further comprising configuring said pressure sensor apparatus to allow the diaphragm side length to be set by the etching in said constraint wafer, thereby permitting a smaller die size to be utilized in a formation of said pressure sensor apparatus.

5. The method of claim 1 wherein said pressure sensor apparatus comprises a gauge pressure sensor.

6. A method of configuring a pressure sensor apparatus, comprising:

etching a constraint wafer to form a cavity, wherein said cavity possesses walls and an opening to at least one surface of said constraint wafer;

forming a composite structure by bonding said constraint wafer to a top wafer, such that a portion of said top wafer covers said opening of said cavity of said constraint wafer;

bonding said constraint wafer to said top wafer to create a junction that enables electrochemical etching and provides an electrical signal when an etching thereof should be stopped;

top processing said top wafer with a plurality of electrical components; and back etching said composite structure to form a media conduit in said composite structure, wherein said media conduit opens to a surface of said composite structure in order to provide for said pressure sensor apparatus.

7. The method of claim 6 wherein said plurality of electrical components further comprises a plurality of piezoresistors and related circuitry and elements.

8. The method of claim 7 wherein said bonded junction between said constraint wafer and said top wafer enables electrochemical etch stopping when performing a final etch.

9. The method of claim 6 further comprising configuring said pressure sensor apparatus to allow said diaphragm side length to be set by said etching in said constraint wafer, thereby permitting a smaller die size to be utilized in a formation of said pressure sensor apparatus.

10. The method of claim 6 wherein said pressure sensor apparatus comprises a gauge pressure sensor.

11. A pressure sensor apparatus, comprising:
   a constraint wafer etched to form a cavity therein, wherein said cavity possesses walls and an opening to at least one surface of said constraint wafer;
   a composite structure formed by bonding said constraint wafer to a top wafer, such that a portion of said top wafer covers said opening of said cavity of said constraint wafer and wherein said composite structure is back etched to form a media conduit in said composite structure, wherein said media conduit opens to a surface of said composite structure in order to provide for said pressure sensor apparatus;
   a bonded junction formed between said constraint wafer and said top wafer that enables an electrochemical etching and provides an electrical signal when said electrochemical etching should be stopped.

12. The apparatus of claim 11 wherein said top wafer comprises a plurality of piezoresistors and related circuitry and elements.

13. The apparatus of claim 12 wherein said bonded junction between said constraint wafer and said top wafer enables an electrochemical etch stopping when performing a final etch.

14. The apparatus of claim 11 wherein said pressure sensor apparatus is configured to allow said diaphragm side length to be set by said electrochemical etching in said constraint wafer, thereby permitting a smaller die size to be utilized in a formation of said pressure sensor apparatus.

15. The apparatus of claim 11 wherein said top wafer comprises a plurality of piezoresistors and related circuitry and elements and wherein said constraint wafer is bonded to said top wafer to create a bonded junction that enables an electrochemical etching and provides an electrical signal when said electrochemical etching should be stopped.

16. The apparatus of claim 11 wherein said constraint wafer is bonded to said top wafer to create a bonded junction that enables an electrochemical etching and provides an electrical signal when said electrochemical etching should be stopped and wherein said bonded junction between said constraint wafer and said top wafer enables an electrochemical etch stopping when performing a final etch.

17. The apparatus of claim 11 wherein:
   said top wafer comprises a plurality of piezoresistors and related circuitry and elements;
   said constraint wafer is bonded to said top wafer to create a bonded junction that enables an electrochemical etching and provides an electrical signal when said electrochemical etching should be stopped; and
   said bonded junction between said constraint wafer and said top wafer enables an electrochemical etch stopping when performing a final etch; said pressure sensor apparatus is configured to allow said diaphragm side length to be set by said electrochemical etching in said constraint wafer, thereby permitting a smaller die size to be utilized in a formation of said pressure sensor apparatus.

* * * * *